United States Patent [19]

Barnhouse

[11] Patent Number: 4,645,801

[45] Date of Patent: Feb. 24, 1987

[54] EPIHALOHYDRIN POLYMERS

[75] Inventor: James P. Barnhouse, North Ridgeville, Ohio

[73] Assignee: The BF Goodrich Company, Akron, Ohio

[21] Appl. No.: 418,312

[22] Filed: Sep. 15, 1982

[51] Int. Cl.[4] .................... C08G 65/48; C08G 65/24
[52] U.S. Cl. .................................. 525/404; 525/187
[58] Field of Search ............................... 525/404

[56] References Cited

U.S. PATENT DOCUMENTS 3,956,224  5/1976  Chu .................................... 525/404
4,251,648  2/1981  Oetzel et al. ...................... 525/187

FOREIGN PATENT DOCUMENTS 48-60751  8/1973  Japan .

*Primary Examiner*—Carman J. Seccuro
*Attorney, Agent, or Firm*—G. A. Kap; A. A. Csontos

[57] ABSTRACT

A composition that is devoid of an unsaturation component, such as an unsaturated glycidyl ether, comprising a polymer of epihalohydrin, an acid acceptor, an unsaturated polyfunctional acrylate or methacrylate, and a curing agent consisting of an organic peroxide.

7 Claims, No Drawings

EPIHALOHYDRIN POLYMERS

BACKGROUND OF THE INVENTION

Epihalohydrin polymers are well known commercial elastomers which have solvent, fuel oil, ozone and heat resistance coupled with low temperature flexibility and easy formability. These elastomers offer a combination of many of the desirable properties of nitrile, polychloroprene, polysulfide, and polyacrylic rubbers.

The epihalohydrin homopolymers are generally resistant to ozone, have extremely low gas permeability, and are well suited for gaskets, oil-field specialties, diaphragms, and pump and valve parts. The epihalohydrin copolymers generally have superior low temperature flexibility for automotive and refrigeration applications such as fuel pump diaphragms, gasoline hose, and oil seals. Paper and printing rolls are other uses. Blends of the homopolymers and copolymers are useful for high temperature conveyor belts and automotive mounts and vibration isolators.

Curing or vulcanization of the epihalohydrin polymers has been a problem in the past. Complex curing systems are required to obtain the desired balance of necessary physical properties in a variety of applications. Many of these curing systems can cause mold fouling and are otherwise undesirable. A simple peroxide cure would be advantageous in many applications for vulcanizing polymers of epihalohydrins or copolymers of epihalohydrin and alkylene oxides. However, up to now, attempts to cure such polymers with organic peroxides have not been successful because the peroxide free radical attacks the ether linkage of the polymer and initiates degradation before the polymer reaches a satisfactory state of cure.

The Sartomer Company Bulletin BP-1 entitled "Basic Principles of Peroxide-Coagent Curing of Elastomers" is in point. This bulletin discloses that certain elastomers cannot be cured with peroxide-coagent systems, the common coagents being the polyfunctional polymethacrylates. Elastomers that cannot be thus cured are said to include epihalohydrin rubbers as well as polyisobutylene, butyl rubber, and polypropylene rubbers.

Oetzel U.S. Pat. No. 4,251,648 discloses compositions comprising a polymer of an epihalohydrin, an unsaturated glycidyl ether, and optionally, alkylene oxide, that are cured in the presence of an organic peroxide, an acid acceptor, and an unsaturated polyfunctional methacrylate. By the use of an unsaturated glycidyl ether, curing of the epihalohydrin polymers can be accomplished without having to resort to the use of such deleterious substances as red lead, certain barium compounds, ethylene thiourea, and the like.

U.S. patent application entitled "Epihalohydrin Cure Systems" filed on May 24, 1982 on behalf of inventor J. P. Barnhouse, is analogous to the Oetzel patent with the exception of disclosing the use of polyol polyacrylate ester coagents in place of unsaturated polyfunctional methacrylate coagents.

Japanese published patent application No. Sho 46-96750 (laid open No. Sho 48-60751), discloses a peroxide curable terpolymer composition comprising a terpolymer of epichlorohydrin, ethylene oxide, and allyl glycidyl ether together with zinc stearate, carbon black, red lead, an antioxidant, and dicumyl peroxide. This publication discloses that homopolymers of epihalohydrins and copolymers of an epihalohydrin with an alkylene oxide either decompose or produce products of very low strength after being cross-linked with an organic peroxide in presence or absence of a coagent.

SUMMARY OF THE INVENTION

This invention relates to epihalohydrin polymers that are devoid of a component that introduces unsaturation into the repeating units of the polymer, such as an unsaturated glycidyl ether. The polymers are cured in the presence of an organic peroxide, an acid acceptor, and an unsaturated polyfunctional acrylate or methacrylate coagent. The peroxides, acid acceptors, and coagents are generally the same as the ones disclosed in the Oetzel patent and the Barnhouse application, mentioned above. Epihalohydrin polymers of this invention can have comparable properties when compared to epihalohydrin polymers containing the unsaturation component.

DETAILED DESCRIPTION OF THE INVENTION

Pursuant to this invention, peroxide cure of saturated epihalohydrin polymers is obtained in thé presence of a polyfunctional coagent and an acid acceptor. The polymers herein are devoid of an unsaturation component that introduces unsaturation into the polymer thus providing crosslinking sites. The unsaturation component is characterized by two distinct features: it contains unsaturation, preferably olefinic unsaturation, and it also contains a polymerizable moiety that makes it possible for the component to polymerize with epihalohydrin and other monomers. Preferred unsaturation components are the monomers that contain an oxirane ring and an ethylenically unsaturated group such as vinyl or allyl. These ethylenically unsaturated epoxides include unsaturated glycidyl ethers, monoepoxides of dienes or polyenes, ethylenically unsaturated glycidyl esters, ets. The unsaturated glycidyl ethers that can be copolymerized with the epihalohydrins, have the general formula,

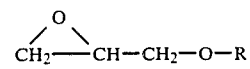

where R is an ethylenically unsaturated radical, as for example, ethylenically unsaturated aliphatic radicals such as vinyl, isopropenyl, allyl, methallyl, butenyl, oleyl, etc. and cycloalkyl or aryl radicals containing an ethylenically unsaturated substituent and cycloalkyl radicals containing an ethylenic double bond in the ring, as for example, 4-vinylcyclohexyl, terpinyl, abietyl, cyclohexenylmethyl, o-allylphenyl, p-vinylbenzyl, etc. Exemplary of these ethers are vinyl glycidyl ether, allyl glycidyl ether, vinylcyclohexyl glycidyl ether, o-allylphenyl glycidyl ether, etc.

The monoepoxides of dienes and polyenes that can be copolymerized with epihalohydrins to produce the copolymers used in this invention, have the general formula

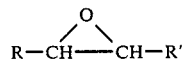

where R is an ethylenically unsaturated radical as defined above and R' is hydrogen, R, alkyl, cycloalkyl, aryl or alkaryl, or R and R' together with the two carbons of the epoxy group may form a cycloaliphatic ring which may itself contain an ethylene double bond or which may be substituted by an ethylenically unsaturated hydrocarbon group, such as a vinyl group. Exemplary of the monoepoxides of dienes and polyenes are butadiene monoxide, chloroprene monoxide, 3,4-epoxy-1-pentene, 4,5-epoxy-2-pentene, 5,6-epoxy-2-hexene, 3,4-epoxy-1-vinylcyclohexene, 1,2-epoxy-5-cyclooctene, 1,2-epoxy-5,9-cyclododecadiene, divinylbenzene monoxide, 5,6-epoxy-1,7-octadiene, etc.

Another class of the ethylenically unsaturated epoxides that can be copolymerized with epihalohydrins to produce the copolymers used in this invention are the glycidyl esters of ethylenically unsaturated carboxylic acids which have the general formula

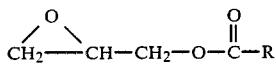

where R is an ethylenically unsaturated radical. Exemplary of such glycidyl esters are glycidyl acrylate, glycidyl methacrylate, glycidyl crotonate, glycidyl 2,4-dimethyl pentenoate, glycidyl sorbate, glycidyl linoleate, glycidyl oleate, glycidyl 3-butenoate, glycidyl 4-methyl-3-pentenoate, glycidyl abietate, the glycidyl ester of 3-cyclohexene carboxylic acid, etc.

As used herein, the term "epihalohydrin polymers" includes epihalohydrin homopolymers and copolymers. The epihalohydrin monomers useful herein include epichlorohydrin, epibromohydrin, epiiodohydrin and epifluorohydrin. Suitable comonomers contain 2 to 10 carbon atoms, preferably 2 to 6, and are selected from cyclic ethers such as phenyl glycidyl ether, allyl glycidyl ether, glycidyl methacrylate, 1,2-epoxy-3,3,3-trichloropropane, trichlorobutylene oxide, trifluoroethyl glycidyl ether, oxetane, ethylene oxide, propylene oxide, tetrahydrofuran, 1,3-dioxolan, and the like. Block copolymers of epihalohydrin can also be synthesized from functionally terminated polymers, preferably hydroxyl terminated, such as hydroxyl terminated polytetrahydrofuran, polybutadiene, poly(butadienestyrene), polyethylene oxide, polypropylene oxide, poly(ethylene oxide-propylene oxide), poly(butadieneacrylonitrile), and the like. In the copolymers, amount of an epihalohydrin can vary from about 1 to 99 parts by weight. In a preferred embodiment, amount of epihalohydrin is in the range of 5 to 90 parts by weight, more preferably 40 to 80 parts, remainder of 100 parts by weight being the comonomers. An unsaturated glycidyl ether can be used in an amount of up to about 10 weight parts in the preparation of a terpolymer of about 40 to 80 weight parts epihalohydrin and 60 to 20 weight parts of an alkylene oxide containing 2 to 3 carbon atoms. Also considered to be a preferred embodiment of the invention herein are the copolymers of 50 to 70 weight parts epichlorohydrin and 50 to 30 weight parts of ethylene oxide.

The epihalohydrin polymers referred to herein include liquid, solid and semi-solid polymers. Liquid polymers have Brookfield viscosity of less than 16,000 Pa.S. at room temperature and have molecular weight (Mn) in the range of 500 to 50,000 but preferably 1000 to 10,000. Preferred epihalohydrin polymers are solid which have molecular weight (Mn) of up to about 1,000,000.

The polymers are readily prepared by polymerization in mass or solution, with catalysts normally formed by reacting an organometallic compound, preferably an organoaluminum compound such as trialkyl aluminum, with water, optionally with a small amount of a chelating agent, such as acetylacetone, ethoxyacetic acid, tetrahydrofuran, and the like. The organo-aluminum compounds may include triethyl aluminum, tripropyl aluminum, triisobutyl aluminum, diethyl aluminum hydride, and the like. There are many patents describing the preparation of such polymers, such as U.S. Pat. Nos. 3,158,581 and 2,219,591. These polymers normally have a number average molecular weight of greater than about 30,000, preferably greater than 60,000, as determined by Gel Permeation Chromatography.

The Dreyfuss U.S. Pat. Nos. 3,850,856 and 3,850,857 describe preparation of hydroxyl-terminated epihalohydrin-polymers in presence of water or a polyol, such as ethylene glycol, with the use of catalytic amounts of a trialkyl oxonium salt of an $HMF_6$ acid where M is selected from phosphorus, arsenic, and antimony.

The peroxide curative of these compositions includes any organic peroxide normally used in the curing of elastomers and polymers. Such materials include dialkyl peroxides, diacyl peroxides, peroxyketo peroxides and monoperoxy carbonates. Specific examples of suitable peroxides include dibenzoyl peroxide, 2,4-dichlorobenzoyl peroxide, dicumyl peroxide, t-butyl cumyl peroxide, tertiary butyl peroxide, lauroyl peroxide, acetyl peroxide, pelargonyl peroxide, tertiarybutyl peroxyacetate, tertiarybutyl peroxyisobutyrate, tertiarybutyl peroxypivalate, bis-tertiarybutyl peroxydiisopropyl benzene, cumene hydroperoxide, acetyl cyclohexyl sulfinyl hydroperoxide, 2,5-dimethyl-2,5-di(t-butylperoxy)hexane, 2,5-dimethyl-2,5-di(t-butylperoxy)hexyne-3,$\alpha,\alpha'$-di [(t-butylperoxy)-isopropyl]benzene, and 4-methyl-4-t-butylperoxy-2-pentanone. The amounts used preferably are greater than 0.1 weight part per 100 weight parts of polymer, more normally, about 1 to 10 weight parts.

Another essential ingredient in order to obtain a stable peroxide cure of the polymers of this invention is an acid acceptor. Suitable acid acceptors are selected from compounds of Group IA, Group IIA and Group IVA elements of the Periodic Table such as magnesium oxide, red lead, potassium and sodium stearate, lead carbonate, calcium oxide, barium carbonate, magnesium silicate, and dibasic lead phosphite. Generally, compounds of Group IA elements, such as Na and K; compounds of Group IIA elements, such as Mg, Ca, Sr and Ba; and compounds of Group IVA elements, such as Pb and Sn of the Periodic Table are contemplated. Quite unexpectedly, it was found that zinc oxide was quite unsatisfactory in the compounds of this invention and contributed to deterioration of the compounds. The acid acceptor may be a salt, particularly a fatty acid salt of sodium or potassium, calcium stearate or oleate and the like, a chelate, a carbonate, an oxide, a silicate, a phosphate, a phthalate, a salicylate, a fatty acid, and many others.

The amounts of acid acceptor used are greater than about 0.1 weight part per 100 weight parts of polymer, and more preferably, about 1 to about 10 weight parts. Although larger amounts may be used, they are not necessary.

There may be used in place of, but more preferably in conjunction with the inorganic Group IA, IIA and IVA compounds defined hereinabove, certain polyfunctional unsaturated coagents, more preferably, difunctional unsaturated compounds including allyl compounds such as diallyl phthalate, triallyl isocyanurate, triallyl cyanurate, triallyl phosphate, and the like, and polyfunctional methacrylates including, for example, allyl methacrylate, tetrahydrofurfuryl methacrylate, triethylene glycol dimethacrylate, ethylene dimethacrylate, tetraethylene glycol dimethacrylate, polyethylene glycol dimethacrylate, diethylene glycol dimethacrylate, 1,6-hexanediol dimethacrylate, polyethylene glycol dimethacrylate, 1,3-butylene glycol dimethacrylate, trimethylolpropane trimethacrylate, and the like. It was unexpectedly discovered that imides can also function as coagents, an example of which is N,N7 m-phenylenedimaleimide.

Also suitable are coagents selected from polyol polyacrylate esters such as ethylene glycoldiacrylate, diethylene glycol diacrylate, triethylene glycol diacrylate, tetraethylene glycol diacrylate, polyethylene glycol diacrylate, 1,6-hexanediol diacrylate, 1,3-butylene glycol diacrylate, trimethylolpropane triacrylate, and the like. Acrylic acid esters of polyols containing 2 to 12 carbon atoms are used, the polyol being normally a diol or a triol. Preferably, diols and triols of di- and triacrylate esters of polyols containing 2 to 6 carbon atoms are employed.

Amount of coagent, or a mixture thereof, can vary from about 0.1 to 10 parts by weight per 100 parts by weight of the polymer, preferably in excess of about 1 part by weight, but for harder polymers, amounts of 20 or more weight parts of a coagent can be used.

The vulcanizates may include a reinforcing pigment such as any of the low, medium and high structure carbon blacks, fine calcium silicate, silica, and the like. The proportion of filler may range from as low as about 5 to about 200 parts for every 100 parts of total rubbery ingredients (hereinafter "PHR") in the compositions. A most preferred range for nonblack fillers is from about 20 to about 150 PHR and for carbon blacks, from about 15 to about 150 PHR.

In addition to the above essential and preferred ingredients, the rubber vulcanizates should otherwise be compounded in accordance with known rubber compounding principles by the inclusion of the required proportions of pigments, lubricants, plasticizers, softeners, stabilizers, antioxidants, antiozonants, tackifiers, diluents, and others to suitably prepare the stock for the particular processing, shaping, forming and/or article building operations envisioned.

The compositions may be prepared and cured by any conventional method. For example, the compositions may be prepared by mill-mixing or by Banbury mixing. Usually, the last addition of ingredients is one of the curatives and this may be effected on a cool rubber mill having water-cooled rolls or in a second pass through a cool Banbury to avoid scorching or precuring the composition. Once mixing is complete, the stock may be sheeted off the rubber mill and made ready for the final molding, extruding, calendering, etc., operations.

The resulting uncured compositions are heated, preferably under confinement or in pressurized steam, at elevated temperatures between about 250° F. to about 475° F., with from about 325° to 400° F. being more preferred. Depending both on the choice and proportions of the curatives and on the temperature in the above ranges, vulcanization is usually complete in a matter of a few minutes ranging from about 2 to 60 minutes. Vulcanization occurs with the production of strong, elastic compositions of good dimensional and chemical stability and good resistance to low temperature in the presence of hydrocarbon fuels in a wide range of environments.

In a preferred embodiment, compositions described herein should have, on curing, a maximum torque ($M_H$) of greater than about 2.25 N.m, a 2-unit rise in torque (ts) of greater than about 1 minute and less than about 6 minutes, and a period to obtain 90% of the maximum cure (tc) of less than about 30 minutes, preferably less than about 20 minutes.

The invention will now be described more fully with reference to a number of specific examples, which are intended as being illustrative only rather than as limiting the invention.

EXAMPLE 1

A terpolymer, a copolymer, and a homopolymer of epichlorohydrin were compounded on a mill with 40 weight parts of FEF furnace black and 1.5 weight parts of a fatty acid soap processing aid to form masterbatches. The terpolymer was prepared by polymerizing 57 weight parts epichlorohydrin, 39 weight parts ethylene oxide, and 4 weight parts allyl glycidyl ether whereas the copolymer was made by polymerizing 55 weight parts epichlorohydrin and 45 weight parts ethylene oxide. The masterbatches were then compounded with varying amounts of various coagents, peroxide curing agents, acid acceptors, activators, antioxidants, and other materials and tested for cure rate in the Monsanto Rheometer following which, the vulcanizates or cured compositions were tested for certain physical properties. Amounts of additives and test results obtained are set forth in Table I, below.

TABLE I

| | Sample Nos. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Compositions | | | | | | | | | | | | |
| Homopolymer Masterbatch | — | — | — | — | — | — | — | — | — | 141.5 | — | — |
| Copolymer Masterbatch | — | — | — | ←141.5→ | | | — | — | — | — | ←141.5→ | |
| Terpolymer Masterbatch | 141.5 | — | — | — | — | — | — | — | — | — | — | — |
| Potassium Stearate | 2.5 | — | — | — | — | — | — | — | — | — | — | — |
| Antioxidant | — | 1.5 | 1.5 | 3 | 3 | 3 | 3 | 3 | 3 | 3 | 1 | 3 |
| Acid Acceptor A | 2.5 | — | 10 | — | — | — | 20 | 3 | — | 5 | 10 | 10 |
| Acid Acceptor B | — | 10 | — | 10 | 10 | 5 | — | — | — | — | — | — |
| Acid Acceptor C | — | — | — | — | — | — | — | 5 | — | — | — | — |
| Acid Acceptor D | — | — | — | — | — | — | — | — | 5 | — | — | — |
| Coagent TMPTM | 3 | 3 | 3 | 3 | 6 | 6 | 6 | 6 | 6 | 6 | — | — |
| Coagent TEGM | — | — | — | — | — | — | — | — | — | — | 6 | — |
| Coagent HVA | — | — | — | — | — | — | — | — | — | — | — | 3 |
| Peroxide | 3 | 3 | 3 | 3 | 3 | 3 | 3 | 3 | 3 | 3 | 3 | 3 |
| Rheometer, 160° C. 100 cpm, 1° Arc, Micro Die ASTM D-2084 | | | | | | | | | | | | |
| $M_H$, N · m | 5.4 | 2.1 | 2.7 | 1.97 | 2.3 | 2.1 | 2.7 | 2.67 | 1.80 | 1.86 | 2.37 | 3.95 |
| ts 2, min. | 1.7 | 3.5 | 3.3 | 4.9 | 3.4 | 3.8 | 3.2 | 1.7 | 2.0 | 2.5 | 3.9 | 6.7 |

TABLE I-continued

| | Sample Nos. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| tc 90% min. | 40.5 | 29.5 | 34 | 33.5 | 35 | 27.5 | 37 | 15 | 7.0 | 22 | 47.5 | 45 |
| Original Properties of Cured Compositions, ASTM D 412 and D-2240 | | | | | | | | | | | | |
| Cure Time, min. | | ←45 min.→ | | | | | | 30 | 15 | 7 | 25 | 40 | 25 |
| Cure Temp. °C. | | ←160→ | | | | | | | ←175→ | | | |
| Tensile Strength, MPa | 14 | 9.55 | 10.1 | 9.79 | 9.51 | 9.51 | 8.61 | 10.61 | 8.27 | 4.96 | 12.41 | 13.44 |
| Ult. Elong., % | 170 | 710 | 420 | 800 | 630 | 760 | 400 | 540 | 820 | 390 | 650 | 270 |
| Shore A Hardness | 70 | 53 | 57 | 50 | 57 | 56 | 63 | 59 | 53 | 68 | 53 | 68 |
| Air Oven Aged for 70 hrs. at 150° C. ASTM D 573-67 | | | | | | | | | | | | |
| Tensile Chg., % | −20 | −83 | −48 | −79 | −74 | −78 | −17 | +3 | −63 | −24 | −63 | −66 |
| Ult. Elong. Chg., % | −10 | −60 | −40 | −75 | −80 | −84 | −60 | −59 | −84 | −72 | −31 | −52 |
| Hardness Chg., % | 0 | −1 | +8 | +6 | +5 | +7 | +13 | +9 | +8 | +12 | +2 | +5 |

Desical P - Acid Acceptor A
Magox - Acid Acceptor B
Dyphos - Acid Acceptor C
Zinc Oxide - Acid Acceptor D In the above table, the antioxidant employed was poly(1,2-dihydro-2,2,4-trimethylquinoline) except that in Sample 11, the antioxidant was nickel dibutyl dithiocarbamate; acid acceptor A was calcium oxide, B was magnesium oxide, C was dibasic lead phosphite, and D was zinc oxide; coagent TMPTM was trimethylolpropane trimethacrylate, coagent TEGM was tetraethylene glycol dimethacrylate, and coagent HVA was N,N7m-pheylendimaleimide; and the peroxide was 2,5-dimethyl-2,5-bis (t-butylperoxy) hexyne-3 used as a 45% active material on calcium carbonate carrier.

Sample 1 in Table I, above, represents a typical formulation containing the terpolymer. The terpolymer formulation or composition showed relatively superior properties to the compositions 2 to 12. For instance, maximum torque ($M_H$) was 5.4 MPa, initial 2-incremental increase in torque (ts) was achieved in 1.7 minutes. Physical properties of sample 1 were also very good. Tensile strength after curing was 14 MPa which dropped only 20% after air oven aging for 70 hours at 150° C. and ultimate elongation dropped 10% from 170% after aging. Shore A hardness remained unchanged after aging. Samples 2 to 12 had advantages and disadvantages when compared to the properties of sample 1. For instance, although sample 2 properties suffered substantially on oven aging, the 90% cure was attained in 29.5 minutes as compared to 40.5 minutes for sample 1. Also, maximum torque was reached in 19 minutes for sample 2 and in 48 minutes for sample 1. Sample 8 is of special interest. It is based on the copolymer, the acid acceptor was dibasic lead phosphite and the coagent was trimethylol propane trimethacrylate. For this sample, rheometer data is particularly good, and although original tensile strength was only 10.61 MPa, this property improved by 3% after oven aging. This is the only sample that showed improvement in tensile strength after oven aging. Another sample of particular interest is sample 10, based on the polyepichlorohydrin. Its rheometer results are fine, however, its tensile strength after curing was only 4.96 MPa which dropped by 24% on oven aging.

Other peroxides, acid acceptors, coagents, and antioxidants were tried and produced acceptable results.

I claim:

1. Composition that is devoid of an unsaturated component in the polymer chain comprising a saturated polymer selected from homopolymers of an epihalohydrin and copolymers of 5 to 90 weight parts of an epihalohydrin and 95 to 10 weight parts of an alkylene oxide selected from ethylene oxide and propylene oxide, an acid acceptor, and a curing agent consisting of an organic peroxide in sufficient amount to obtain a cured composition.

2. Composition of claim 1 wherein the copolymer is prepared from 40 to 80 weight parts epihalohydrin and 20 to 60 weight parts alkylene oxide, and wherein the composition includes in excess of about 1 weight part of a coagent, amount of the acid acceptor is in excess of about 1 weight part and amount of the peroxide is greater than about 1 part by weight, per 100 weight parts of the polymer.

3. Composition of claim 2 wherein the polymer is selected from saturated copolymers of an epihalohydrin and an alkylene oxide, the acid acceptor is selected from compounds of Group IA, Group IIA and group IVA elements, the coagent is selected from polyfunctional acrylates and methacrylates, and the curing agent is selected from dialkyl peroxides, diacyl peroxides, peroxyketo peroxides, and monoepoxy carbonates.

4. Composition of claim 3 wherein the polymer is selected from liquid polymers having molecular weight (Mn) of about 1000 to 10,000 and from solid polymers having molecular weight of up to about one million; the acid acceptor is selected from dibasic lead phosphite and calcium oxide; the curing agent is selected from dicumyl peroxide, 2,5-dimethyl-2,5-di(t-butylperoxy)-hexane, 2,5-dimethyl-2,5-di(t-butylperoxy) hexyne-3, α,α'-di [(t-butylperoxy)-isopropyl] benzene, 4-methyl-4-t-butylperoxy-2-pentanone, t-butylcumyl peroxide, dibenzoyl peroxide, and 2,4-dichlorobenzoyl peroxide; and the coagent is selected from the group consisting of triethylene glycol dimethacrylate, trimethylolpropane trimethacrylate, and trimethylolpropane triacrylate.

5. Composition of claim 4 wherein the epihalohydrin is epichlorohydrin; amount of the acid acceptor, coagent and the curing agent is up to about 10 weight parts of each; and wherein the composition attains, on curing, a maximum torque ($M_H$) greater than about 2.25 N m, a 2-unit initial rise in torque (ts) of greater than about 1 minute and less than about 6 minutes, and 90% of maximum cure (tc) of less than about 30 minutes.

6. Composition of claim 4 wherein the polymer is a copolymer of 50 to 70 weight parts epichlorohydrin and 50 to 30 weight parts ethylene oxide prepared in the presence of water or a polyol with the use of a catalytic amount of a trialkyl oxonium salt of an $HMF_6$ acid where M is selected from phosphorus, arsenic and antimony.

7. Composition of claim 6 in a cured state.

* * * * *

UNITED STATES PATENT AND TRADEMARK OFFICE
CERTIFICATE OF CORRECTION

PATENT NO. : 4,645,801
DATED : February 24, 1987
INVENTOR(S) : James P. Barnhouse It is certified that error appears in the above—identified patent and that said Letters Patent is hereby corrected as shown below:

Column 8, line 19; after "an acid acceptor," add
-- a coagent selected from polyfunctional unsaturated acrylates and methacrylates, --.

Column 8, line 24; after "20 to 60 weight parts alkylene oxide," delete -- and wherein the composition includes in excess of about 1 weight parts of a coagent, --.

Column 8, line 27; after "about 1 weight part", add
-- amount of the coagent is in excess of about 1 weight part, --.

Column 8, line 34; after "elements," delete
-- the coagent is selected from polyfunctional acrylates and methacrylates, --.

Signed and Sealed this

Eighth Day of November, 1988

*Attest:*

DONALD J. QUIGG

*Attesting Officer*    *Commissioner of Patents and Trademarks*